US010364674B2

(12) United States Patent
Brandl et al.

(10) Patent No.: US 10,364,674 B2
(45) Date of Patent: Jul. 30, 2019

(54) CUTTING APPARATUS AND METHOD OF OPERATING

(71) Applicant: SANDVIK INTELECTUAL PROPERTY AB, Sandviken (SE)

(72) Inventors: Erich Brandl, Grosslobming (AT); Bernhard Ebner, Knittelfeld (AT)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 27 days.

(21) Appl. No.: 15/517,171

(22) PCT Filed: Oct. 2, 2015

(86) PCT No.: PCT/EP2015/072845
§ 371 (c)(1),
(2) Date: Apr. 6, 2017

(87) PCT Pub. No.: WO2016/055381
PCT Pub. Date: Apr. 14, 2016

(65) Prior Publication Data
US 2017/0306759 A1   Oct. 26, 2017

(30) Foreign Application Priority Data
Oct. 6, 2014   (WO) .................. PCT/EP2014/071334

(51) Int. Cl.
*E21C 35/00* (2006.01)
*E21C 35/06* (2006.01)
(Continued)

(52) U.S. Cl.
CPC .............. *E21C 35/06* (2013.01); *E21C 25/06* (2013.01); *E21C 25/18* (2013.01); *E21C 27/24* (2013.01); *E21C 29/22* (2013.01); *E21C 35/08* (2013.01); *E21D 9/1013* (2013.01); *E21D 9/1026* (2013.01); *E21D 9/1033* (2013.01); *E21D 9/1093* (2013.01); *E21D 20/003* (2013.01);
(Continued)

(58) Field of Classification Search
CPC .......... E21C 35/06; E21C 29/00; E21C 29/02; E21C 29/22; E21C 29/24; E21C 29/26; E21C 31/12
USPC ......................................... 299/75
See application file for complete search history.

(56) References Cited

U.S. PATENT DOCUMENTS 3,663,054 A   5/1972   Dubois
4,740,037 A *  4/1988   Eager .................... E21C 27/24
                                                299/33

(Continued)

FOREIGN PATENT DOCUMENTS

DE   202111050143 U1   10/2012
GB      1419148 A        12/1975
(Continued)

*Primary Examiner* — Janine M Kreck
(74) *Attorney, Agent, or Firm* — Corinne R. Gorski

(57) ABSTRACT

A cutting apparatus suitable for creating tunnels and subterranean roadways includes independently pivoting supports that each carries a respective independently pivoting arm and a rotatable cutting head. Each cutting head via the supports and arms is configured to slew laterally outward in a sideways direction and to pivot in a vertical upward and downward direction. The supports and arms are mounted on a linear moving sled carried by a main frame.

15 Claims, 9 Drawing Sheets

(51) Int. Cl.
*E21C 27/24* (2006.01)
*E21D 9/10* (2006.01)
*E21C 25/18* (2006.01)
*E21C 29/22* (2006.01)
*E21D 20/00* (2006.01)
*E21C 25/06* (2006.01)
*E21C 35/08* (2006.01)
*F16H 57/023* (2012.01)
*F15B 11/16* (2006.01)

(52) U.S. Cl.
CPC .............. *F15B 11/16* (2013.01); *F16H 57/023* (2013.01); *F16H 2057/0235* (2013.01)

(56) References Cited

U.S. PATENT DOCUMENTS

| | | | | |
|---|---|---|---|---|
| 5,333,936 A | * | 8/1994 | Zitz | ................. E21C 27/24 299/31 |
| 8,690,262 B2 | * | 4/2014 | Ebner | ................. E21D 9/1006 299/75 |
| 2001/0002974 A1 | * | 6/2001 | Dimillo | ................. E02F 9/024 414/565 |
| 2003/0230925 A1 | | 12/2003 | Oishi | |

FOREIGN PATENT DOCUMENTS

| | | |
|---|---|---|
| GB | 2124407 A | 2/1984 |
| WO | 92/21854 A1 | 12/1992 |
| WO | 98/11304 A1 | 3/1998 |
| WO | 85/02653 A1 | 10/2003 |
| WO | 2010050872 A1 | 5/2010 |
| WO | 2011093777 A1 | 8/2011 |
| WO | 2012156841 A2 | 11/2012 |
| WO | 2012156842 A2 | 11/2012 |
| WO | 2012156884 A2 | 11/2012 |
| WO | 2014090589 A2 | 6/2014 |

* cited by examiner

CUTTING APPARATUS AND METHOD OF OPERATING

RELATED APPLICATION DATA

This application is a § 371 National Stage Application of PCT International Application No. PCT/EP2015/072845 filed Oct. 2, 2015 claiming priority of EP Application No. PCTEP2014071334, filed Oct. 6, 2014.

FIELD OF INVENTION

The present invention relates to rock cutting apparatus suitable for creating tunnels or subterranean roadways and in particular, although not exclusively, to undercutting apparatus in which a plurality of rotating heads are capable of being slewed laterally outward and raised in the upward and downward direction during forward cutting. The invention also relates to a method of operating such cutting apparatus.

BACKGROUND ART

A variety of different types of excavation machines have been developed for cutting drifts, tunnels, subterranean roadways and the like in which a rotatable cutting head is mounted on an arm that is in turn movably mounted at a main frame so as to create a desired tunnel cross sectional profile. WO2012/156841, WO 2012/156842, WO 2010/050872, WO 2012/156884, WO2011/093777, DE 20 2111 050 143 U1. All described apparatus for mill cutting of rock and minerals in which a rotating cutting head forced into contact with the rock face as supported by a movable arm. In particular, WO 2012/156884 describes the cutting end of the machine in which the rotatable heads are capable of being raised and lowered vertically and deflecting in the lateral sideways direction by a small angle in an attempt to try enhance the cutting action.

WO 2014/090589 describes a machine for digging roadways tunnels and the like in which a plurality of cutting heads are movable to dig into the rock face via a pivoting arcuate cutting path. US 2003/0230925 describes a rock excavator having a cutter head mounting a plurality of annular disc cutters suitable to operate in an undercutting mode.

It has been observed that a transition from a stationary arrangement of the cutting apparatus to a configuration of the cutting apparatus which allows for a movement of the overall cutting apparatus conventionally may involve time-consuming configuration changes, which add up to an amount time in which the cutting apparatus is not in use per se, i.e. is rather in preparation for the actual cutting.

Furthermore, it has been observed that conventional cutting machines are not optimised to cut hard rock having a strength typically beyond 120 MPa whilst creating a tunnel or subterranean cavity safely and reliably of desired cross sectional configuration. Accordingly, what is required is a cutting machine that addresses these problems.

SUMMARY OF THE INVENTION

It is an objective to provide a cutting apparatus or machine and a method of operation such cutting apparatus or machine allowing for an improved ratio of productive cutting operation to preparation procedure, during which no cutting is provided.

It is a further objective of the present invention to provide a cutting machine suitable to form tunnels and subterranean roadways being specifically configured to cut hard rock beyond 120 MPa in a controlled and reliable manner. It is a further specific objective to provide a cutting machine capable of creating a tunnel with a variable cross sectional area within a maximum and a minimum cutting range. It is a further specific objective to provide a cutting (excavator) machine operable in an 'undercutting' mode according to a two stage cutting action.

The objective of allowing for the improved ratio is achieved by providing a cutting apparatus suitable for creating tunnels or subterranean roadways and the like comprising a main frame having generally upward, downward and side facing regions, at least one arm pivotally mounted via an arm pivot axis aligned in a direction extending transverse including perpendicular to a generally upright direction relative to the upward and downward facing regions to enable the arm to pivot relative to the main frame in an upward and downward direction relative to the upward and downward facing regions, at least one arm actuator to actuate pivoting movement of the arm relative to the main frame, a rotatable cutting head mounted at the arm rotatable about a head axis orientated to extend substantially transverse to the arm pivot axis, a pair of crawler tracks or a set of wheels allowing a forward and rearward movement of the cutting apparatus over ground, and a set of floor engaging members mounted at the main frame, wherein the floor engaging members are extendable to provide a cutting mode of the cutting apparatus, in which the cutting apparatus rests on the floor engaging members, and are retractable to provide a non-cutting mode of the cutting apparatus, in which the cutting apparatus rests on the pair of crawler tracks or set of wheels, wherein the pair of crawler tracks or the set of wheels define a plane inclined relative to the main frame such that upon changing from the cutting mode to the non-cutting mode the cutting head is raised away from the ground.

In this context, the invention further provides for a method of operating a cutting apparatus for creating tunnels or subterranean roadways and the like, wherein the cutting apparatus comprises a main frame having generally upward, downward and side facing regions, at least one arm pivotally mounted via an arm pivot axis aligned in a direction extending transverse including perpendicular to a generally upright direction relative to the upward and downward facing regions to enable the arm to pivot relative to the main frame in an upward and downward direction relative to the upward and downward facing regions, at least one arm actuator to actuate pivoting movement of the arm relative to the main frame, a rotatable cutting head mounted at the arm, a pair of crawler tracks or a set of wheels allowing a forward and rearward movement of the cutting apparatus over ground, and a set of floor engaging members mounted at the main frame, wherein the method comprises a cutting step, a non-cutting step including a forward or rearward movement of the cutting apparatus over ground, a first transition step from the non-cutting step to the cutting step including an extending of the floor engaging members such that cutting apparatus rests on the floor engaging members, and a second transition step from the cutting step to the non-cutting step including a retracting of the floor engaging members such that the cutting apparatus rests on the pair of crawler tracks or set of wheels, wherein the pair of crawler tracks or the set of wheels define a plane inclined relative to the main frame such that the second transition step includes a backward-tilting of the cutting apparatus, causing the rotatable cutting head to be raised away from the ground.

The aspects of the invention discussed above address a forward and/or rearward movement of the main frame and the cutting apparatus in total in relation to the ground, i.e. a relocation of the cutting apparatus rather than a reconfiguration in which only elements of the cutting apparatus are arranged in a different relational manner.

That the cutting apparatus is in the non-cutting mode does not necessarily imply that a cutting operation is not possible; as the focus of the non-cutting mode is that the apparatus is in a mode which enables movement of the cutting apparatus as a whole. It is preferred that the cutting is performed in the cutting mode, as in such case there is stabilization provided, while reaction forces from the cutting process are prevented from having effect on the crawler tracks or set of wheels (or the carriage to which these are mounted).

The functionality of securing or stabilizing the cutting machine is fulfilled by the engaging members, which are thus provided for moving the cutting machine upwards and downwards. On the other side, the functionality of allowing for a forward and rearward movement of the machine is provided by the crawler tracks or set of wheels. In this manner, simple and cost-effective structures may be used. In particular, preferably the pair of crawler tracks or set of wheels are basically fixed in term of an upwards or downwards movement (safe for rather minute movements in the context of suspension and the like) and also define the inclined plane in a fixed manner.

The lower surface(s) of the pair of crawler tracks or set of wheels define a plane (which coincides with the ground when the cutting apparatus is resting on the pair of crawler tracks or set of wheels), wherein this plane is inclined with respect to the main frame (or overall cutting apparatus). When this is considered independently from the issue of whether or not the cutting apparatus is resting on the ground (either on the floor engaging members or on the pair of crawler tracks or set of wheels), the above mentioned plane is oriented such that in a default position of the cutting head(s) with the arm being substantially directed downwards or approximately downwards, there is a predetermined distance between the plane and the cutting head. This distance corresponds, under the assumption of an even ground, to the clearance of the cutting head from the ground when the cutting machine is resting on the pair of crawlers or set of wheels.

Preferably, the inclination of the plane defined by the pair of crawler tracks or the set of wheels relative to the main frame is in the range from 1° to 10°, preferably in the range of 2° to 6°, most preferably approximately 2°. It was found that by means of such an inclination a proper clearance can be achieved while avoiding an excessive tilting of the cutting apparatus. Phrased differently, preferably, the inclination of the plane defined by the pair of crawler tracks or the set of wheels relative to the main frame is set such that the cutting head is raised in an amount in the range from 3 cm to 30 cm, preferably in the range of 6 cm to 20 cm, most preferably approximately 6 cm.

Further, preferably, the method of operating includes an adjustment step of adjusting a direction and/or position of the cutting apparatus by means of the floor engaging members and/or the pair of crawler tracks or set of wheels. In particular, the attitude of the cutting apparatus in relation to the ground corresponding to a certain extend to the direction in which the cutting apparatus is facing (and cutting) can be adjusted by controlling an extent of extension or retraction of the floor engaging elements separately.

The objective of allowing for the improved ratio is also achieved by providing a cutting apparatus suitable for creating tunnels or subterranean roadways and the like comprising a main frame having generally upward, downward and side facing regions, a powered sled movably mounted at the main frame and configured to slide in a forward cutting direction of the cutting apparatus relative to the main frame, at least one arm pivotally mounted to the sled via an arm pivot axis aligned in a direction extending transverse including perpendicular to a generally upright direction relative to the upward and downward facing regions to enable the arm to pivot relative to the main frame in an upward and downward direction relative to the upward and downward facing regions, at least one arm actuator to actuate pivoting movement of the arm relative to the main frame, and a rotatable cutting head mounted at the arm, wherein the cutting apparatus further comprises engaging members mounted at the main frame, the engaging members including floor engaging members and at least one of roof engaging members and side wall engaging members, at least the floor engaging members being extendable and retractable to respectively raise and lower the apparatus in the upward and downward direction, wherein at least one roof or side wall engaging member is mounted to the powered sled and is configured for being extended for wedging the cutting apparatus in cooperation with the other engaging members in a cutting mode of the cutting apparatus between roof or side wall and floor.

In this context, the invention further provides for a method of operating a cutting apparatus for creating tunnels or subterranean roadways and the like, wherein the cutting apparatus comprises a main frame having generally upward, downward and side facing regions, a powered sled movably mounted at the main frame and configured to slide in a forward cutting direction of the cutting apparatus relative to the main frame, at least one arm pivotally mounted to the sled via an arm pivot axis aligned in a direction extending transverse including perpendicular to a generally upright direction relative to the upward and downward facing regions to enable the arm to pivot relative to the main frame in an upward and downward direction relative to the upward and downward facing regions, at least one arm actuator to actuate pivoting movement of the arm relative to the main frame, a rotatable cutting head mounted at the arm, and engaging members mounted at the main frame, the engaging members including floor engaging members and at least one of roof engaging members and side wall engaging members, at least the floor engaging members being extendable and retractable to respectively raise and lower the apparatus in the upward and downward direction, wherein at least one roof or side wall engaging member is mounted to the powered sled, wherein the method comprises an anchoring step of extending at least the floor engaging member so to wedge the cutting apparatus between roof or side wall and floor, and an operation step including an extending of the at least one roof or side wall engaging member mounted to the powered sled for cooperating with the other engaging members in wedging the cutting apparatus between roof or side wall and floor.

The following insight is underlying this aspect of the invention. As the cutting is performed by pivoting the arm in an preferably upwards direction, such cutting process does not include a movement of the sled, the sled is basically stationary during such process and may therefore be involved in fixing or stabilizing the cutting machine against forces from the cutting. This allows that the roof or side wall engaging element is mounted to the sled, which in turn allows for an increased stroke of the sled movement without increasing the overall size or length of the cutting apparatus.

With the possible extent of the movement of the sled being enlarged, the number of times of complete cutting apparatus needs to be moved in total in order achieve a certain distance in cutting is reduced.

In order to combine the above discussed aspects, the present invention provides further for an cutting apparatus according to the first aspect which further comprises a powered sled movably mounted at the main frame and configured to slide in a forward cutting direction of the cutting apparatus relative to the main frame, wherein the at least one arm is mounted to the sled, and a set of roof or side wall engaging members mounted at the main frame, wherein at least one roof or side wall engaging member is mounted to the powered sled and is configured for being extended for wedging the cutting apparatus in cooperation with the other engaging members in a cutting mode of the cutting apparatus between roof or side wall and floor.

Preferably, the floor engaging members are configured for arranging the cutting apparatus, in the cutting mode, such that the upward facing region is horizontal and/or parallel to the ground. In particular, the floor engaging members are configured for arranging the cutting apparatus, in the cutting mode, such that a movement direction of the powered sled is parallel to the ground. The floor engaging member configured in such manner allow advantageously for an adjustment of the attitude of the cutting apparatus in relation to the ground.

Preferably, the engaging members include two front floor engaging members, two rear engaging members, two roof engaging members and the roof engaging member mounted to the sled, wherein the two roof engaging members are mounted to the main frame at a position backwards in relation to the sled. The position of the two roof engaging members backwards in relation to the sled is not particularly limited and these roof engaging members may be provided approximately in the middle of the cutting apparatus (in forwards/backwards direction) as well as in the backwards portion of the cutting apparatus.

Preferably, the engaging members are each extendable and retractable linearly by means of a respective control cylinder, in particular by means of a hydraulic cylinder.

Preferably, in regard to the above discussed method aspect of the invention, the operation step further includes, after the extending of the engaging member, a cutting step including a pivoting of the arm relative to the main frame and a cutting by means of the cutting head, wherein the operation step further includes, after the cutting, a retracting of the engaging member and a moving of the sled. The operation step thus preferably includes an extending of the roof or side wall engaging member (to secure the cutting apparatus), a cutting step in which the arm (on which the cutting head is mounted) is pivoted and the cutting head cuts the rock in front of the cutting apparatus (particularly in an undercutting manner), a retracting of the roof or side wall engaging member mounted to the sled and a moving of the sled (made possible due to the retracting of the engaging member which would otherwise block such movement). Preferably, the operation step includes multiple repetitions of the extending, the cutting step and the retracting and moving in this order.

In combination of the above aspects, the invention also provides for a method of operating according to the second aspect wherein the cutting apparatus further comprises a pair of crawler tracks or a set of wheels allowing a forward and rearward movement of the cutting apparatus over ground, wherein the method further comprises a non-cutting step including a forward or rearward movement of the cutting apparatus over ground, a second transition step from the anchoring or operation step to the non-cutting step including a retracting of the floor engaging members such that the cutting apparatus rests on the pair of crawler tracks or set of wheels, wherein the pair of crawler tracks or the set of wheels define a plane inclined relative to the main frame such that the second transition step includes a backward-tilting of the cutting apparatus, causing the rotatable cutting head to be raised away from the ground.

In regard to the cutting apparatus as they are discussed above, it is preferred that the rotatable cutting head(s) is/are rotatable about a head axis orientated to extend substantially transverse to the arm pivot axis. Other arrangements or configurations of the rotatable cutting head are also contemplated, including but not limited to a configuration as disclosed, for example, in U.S. Pat. No. 8,690,262 B2.

It is noted that the engaging members do not necessarily have to have direct contact with the floor, the roof and/or the side wall(s), as long as the function of stabilizing the cutting apparatus is fulfilled; as there might as well be indirect contact, e.g. in that further elements (not being part of the cutting apparatus as such) may be present between the engaging members and the floor, roof or side wall(s).

The further objectives are achieved by providing a cutting apparatus having a plurality of rotatably mounted cutting heads that may be pivoted in an upward and downward direction and a lateral side-to-side direction via a plurality of independently pivoting booms mounted at a main frame. In particular, each boom comprises a support pivotally mounted to the main frame and carrying an arm via a respective additional pivot mounting such that each cutting head is capable of pivoting about two pivoting axes. The desired range of movement of each head is provided as the dual pivoting axes are aligned transverse (including perpendicular) to one another and are spaced apart in the longitudinal direction of the apparatus between a forward and rearward end.

Advantageously, the cutting heads comprise a plurality of disc-like roller cutters distributed circumferentially around a perimeter of each head so as to create a groove or channel into the rock face as the heads are driven about their respective rotational axes. The heads may then be raised vertically so as to overcome the relatively low tensile strength of the overhanging rock to provide breakage via force and energy that is appreciably lower than a more common compressive cutting action provided by cutting picks and the like.

According to a further aspect of the present invention there is provided cutting apparatus suitable for creating tunnels or subterranean roadways and the like comprising: a main frame having generally upward, downward and side facing regions; a first and second support pivotally mounted relative to the main frame via respective first and second support axes aligned generally upright relative to the upward and downward facing regions such that each first and second support is configured to pivot laterally in a sideways direction relative to the side facing regions; at least one first and second support actuator to respectively actuate independently movement of each of the first and second supports relative to the main frame; a first and second arm each pivotally mounted to the respective first and second support via a respective arm pivot axis aligned in a direction extending transverse including perpendicular to each support pivot axis to enable the first and second arms to pivot independently of one another and to pivot relative to each of the respective first and second supports in an upward and downward direction relative to the upward and downward facing regions; at least one first and second arm actuator to actuate independently pivoting movement of the first and second arms relatives to each of the respective first and second support; a rotatable cutting head mounted at each of the first and second arms, each head rotatable about a head axis orientated to extend substantially transverse to each respective arm pivot axis.

Reference within this specification to each head being rotatable about a head axis orientated to extend substantially transverse to each respective arm pivot axis includes (or encompasses) a perpendicular alignment. Such a reference also encompasses the respective pivot axes intersecting or more preferably not intersecting with the rotational axes of the cutting heads. Optionally, the rotational axes of the cutting heads are positioned generally in front of and/or above the respective pivot axes of the pivot arms.

Optionally, each cutting head comprises a generally annular cutting edge or layered cutting edges to provide an undercutting mode of operation. The configuration of each head to provide the undercutting action is advantageous to break the rock with less force and in turn provide a more efficient cutting operation that draws less power.

Preferably, the apparatus comprises a plurality of roller cutters independently rotatably mounted at each rotatable cutting head. Preferably, the roller cutters are generally annular roller cutters each having a generally annular cutting edge or layered cutting edges to provide an undercutting mode of operation. More preferably, the roller cutters are mounted at a perimeter region of each cutting head such that the roller cutters circumferentially surround each cutting head. Such a configuration is advantageous to provide the undercutting action of the apparatus with the roller cutters first creating a channel or groove extending generally horizontally in the rock face. The roller cutters may then be moved upwardly to break the rock by overcoming the tensile forces immediately above the channel or groove. A more efficient cutting operation is provided requiring less force and drawing less power. Preferably, the roller cutters are mounted at generally cylindrical bodies and comprise generally annular cutting edges distributed around the perimeter of the cutting head. Each generally circular cutting edge is accordingly positioned side-by-side around the circumference of the cutting head with each cutting edge representing an endmost part of each pivoting arm. Preferably an alignment of the rotational axes of the roller cutters relative to the rotational axis of the respective cutting head is the same so that the respective cutting edges are all orientated in the same position around the cutting head.

Preferably, each of the first and second arm actuator comprises a planetary gear assembly mounted at the junction at which each arm pivots relative to each support. The subject invention may comprise a conventional planetary gear arrangement such as a Wolfram type planetary gear having a high gear ratio. The planetary gear assembly is mounted internally with each arm such that the cutting apparatus is designed to be as compact as possible. Preferably, the apparatus further comprises at least one first drive motor to drive the pivoting movement of the first and/or second arm relative to the respective first and second support and the main frame. Preferably, the apparatus comprises two drive motors to drive each of the first and second arms about their pivoting axis via the respective planetary gears. Preferably, the respective drive motors are mounted in-board of each arm and are coupled to each arm via the planetary gear assembly and/or an intermediate drive transmission.

Preferably, the apparatus further comprises at least one second drive motor to drive rotation of the cutting head at the first and/or the second arm. Preferably, each head comprises two drive motors mounted at the side of each arm. Such an arrangement is advantageous to pivot each drive motor with each cutting head and to provide a direct drive with minimal intermediate gearing.

Optionally, the first and second support actuator comprises a hydraulic linear actuator. Preferably, each support actuator comprises a linear hydraulic cylinder positioned at the lateral sides of the sled and coupled to extend between the sled and an actuating flange extending laterally outward from each support. Such an arrangement is advantageous to minimise the overall width of the apparatus whilst providing an efficient mechanism for the sideways lateral slewing of each support and accordingly each arm.

Optionally, the sled may be positioned to operate longitudinally between the supports and each of the respective arms. That is, each arm may be configured to slide in the axially forward direction relative to each support via one or a plurality of actuators. Optionally, each arm is connected to each support via a respective sliding actuator such that each arm is configured to slide independently relative to one another. Optionally, each arm may be configured to slide in a forward and rearward direction relative to each support via a coordinated parallel sliding mechanism.

Preferably, the apparatus further comprises a powered sled movably mounted at the main frame to be configured to slide in a forward cutting direction of the apparatus relative to the main frame. The apparatus may further comprise a plurality of 'runners' or guide rails to minimise the frictional sliding movement of the sled over the main frame. Preferably, the apparatus comprises at least one powered linear actuator to provide the forward and rearward movement of the sled relative to the main frame. As will be appreciated, the sled may be configured to move axially/longitudinally at the machine via a plurality of different actuating mechanisms including rack and pinion arrangements, belt drive arrangements, gear arrangements and the like. Preferably the supports and the arms are mounted at the sled and are all configured to move in the forward and rearward direction collectively.

Optionally, each of the first and second arms is configured to pivot in the upward and downward direction by up to 180°. Optionally, each arm may be configured to pivot over a range of up to 155°. Optionally, the first and second supports are configured to pivot in the lateral sideways direction by up to 90°. Optionally, the supports may be configured to pivot up to 20° in the lateral sideways direction. Such a configuration provides control of the profile shape and avoids any cuts or ridge that would otherwise remain on the roof and floor of the as-formed tunnel.

Preferably, the apparatus comprises tracks or wheels mounted at the main frame to allow the apparatus to move in a forward and rearward direction. The tracks or wheels enable the apparatus to be advanced forwardly and rearwardly within the tunnel both when manoeuvred into and from the cutting face between cutting operations and to be advanced forwardly during cutting operations as part of the cut-and-advance cutting cycle that also utilises the sliding sled.

Preferably, the apparatus further comprises floor and roof engaging members mounted at the main frame, at least the floor engaging members being extendable and retractable to respectively raise and lower the apparatus in the upward and downward direction. The engaging members are configured to wedge the apparatus in position between the roof and floor of the tunnel to provide points of anchorage against which the machine may be braced to allow the cutters to be forced against the rock face.

Preferably, the apparatus further comprises a first material discharge conveyor to convey cut material rearwardly from the first and second cutting head; and a gathering head to direct cut material onto the conveyor, the gathering head positioned rearwardly behind at least one of the first and second cutting heads. The apparatus is accordingly configured to transport rearwardly material from the cut face to provide unhindered forward cutting movement into the rock.

Preferably, the apparatus further comprises a control unit demountably connectable to the apparatus, the control unit comprising operational components to power at least the first and second support and arm actuators, the control unit further comprising a second conveyor to receive material from the first conveyor and to discharge the material at a position rearward of the apparatus and the control unit. Preferably, the control unit is demountably coupled to the apparatus so as to be capable of being advanced and retracted in the forward and rearward directions with the cutting apparatus. Preferably, the control unit is suspended above the tunnel floor by suitable couplings to the apparatus. The control unit may comprise ground engaging support members provided at a rearward and/or forward regions. Optionally, the control unit may be attachable at its rearward end to a material collection and discharge vehicle and to be connectable at its forward end to the cutting apparatus.

According to a further aspect of the present invention there is provided cutting apparatus suitable for creating tunnels or subterranean roadways and the like comprising: a main frame having generally upward, downward and side facing regions; a powered sled movably mounted at the main frame to be configured to slide in a forward cutting direction of the apparatus relative to the main frame; a first and second arm pivotally coupled or mounted to the sled by respective pivot arm axes aligned in a direction extending transverse including perpendicular to a longitudinal axis of the main frame to allow each arm to pivot independently of one another in an upward and downward direction relative to the upward and downward facing region of the main frame; at least one first and second arm actuator to actuate independent pivoting movement of the first and second arms relative to one another and the main frame; a rotatable cutting head mounted at each of the first and second arms so as to be configured to be moved in the upward and downward direction and advanced in the forward cutting direction, each head rotatable about a head axis orientated to extend substantially transverse to respective pivot arm axes.

Optionally, the first and second arm together with the respective pivot arm axes are respectively coupled or mounted to the sled via a first and second support, the first and second supports are slidably mounted relative to the sled via a common or respective slidable means such that each first and second support is configured to slide laterally in a sideways direction relative to the side facing regions. The first and second supports are mounted at the sled and configured to slide laterally cross the sled substantially perpendicular to the forward and backward sliding movement of the sled relative to the main frame.

Optionally, each rotatable cutting head comprises a generally annular roller cutter each having a generally annular cutting edge or layered cutting edges to provide an undercutting mode of operation.

Preferably, the apparatus further comprises a plurality of roller cutters independently rotatably mounted at each rotatable cutting head. Optionally, the plurality of roller cutters is generally annular roller cutters each having a generally annular cutting edge or layered cutting edges to provide an undercutting mode of operation.

According to a further aspect of the present invention there is provided cutting apparatus configured to create a cutting profile via an undercutting operation to create tunnels and subterranean roadways, the apparatus comprising: a main frame; a first and second arm pivotally mounted to the main frame by respective pivot arm axes aligned in a direction extending transverse including perpendicular to a longitudinal axis of the main frame to allow each arm to pivot independently of one another in an upward and downward direction relative to an upward and downward facing region of the main frame; at least one first and second arm actuator to actuate independent pivoting movement of the first and second arms relative to one another and the main frame; a rotatable cutting head mounted at each of the first and second arms, each cutting head comprising generally annular roller cutters each having a generally annular cutting edge to provide an undercutting mode of operation.

Preferably, the apparatus comprises a first and second support pivotally mounted relative to the main frame via respective first and second support axes aligned generally upright relative to the upward and downward facing regions such that each first and second support is configured to pivot laterally in a sideways direction relative to the side facing regions.

Preferably, the apparatus further comprises a powered sled movably mounted at the main frame, the first and second arms mounted at the sled so as to be capable of longitudinal reciprocating movement to slide in a forward cutting direction of the apparatus to engage the roller cutters into the rock face.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
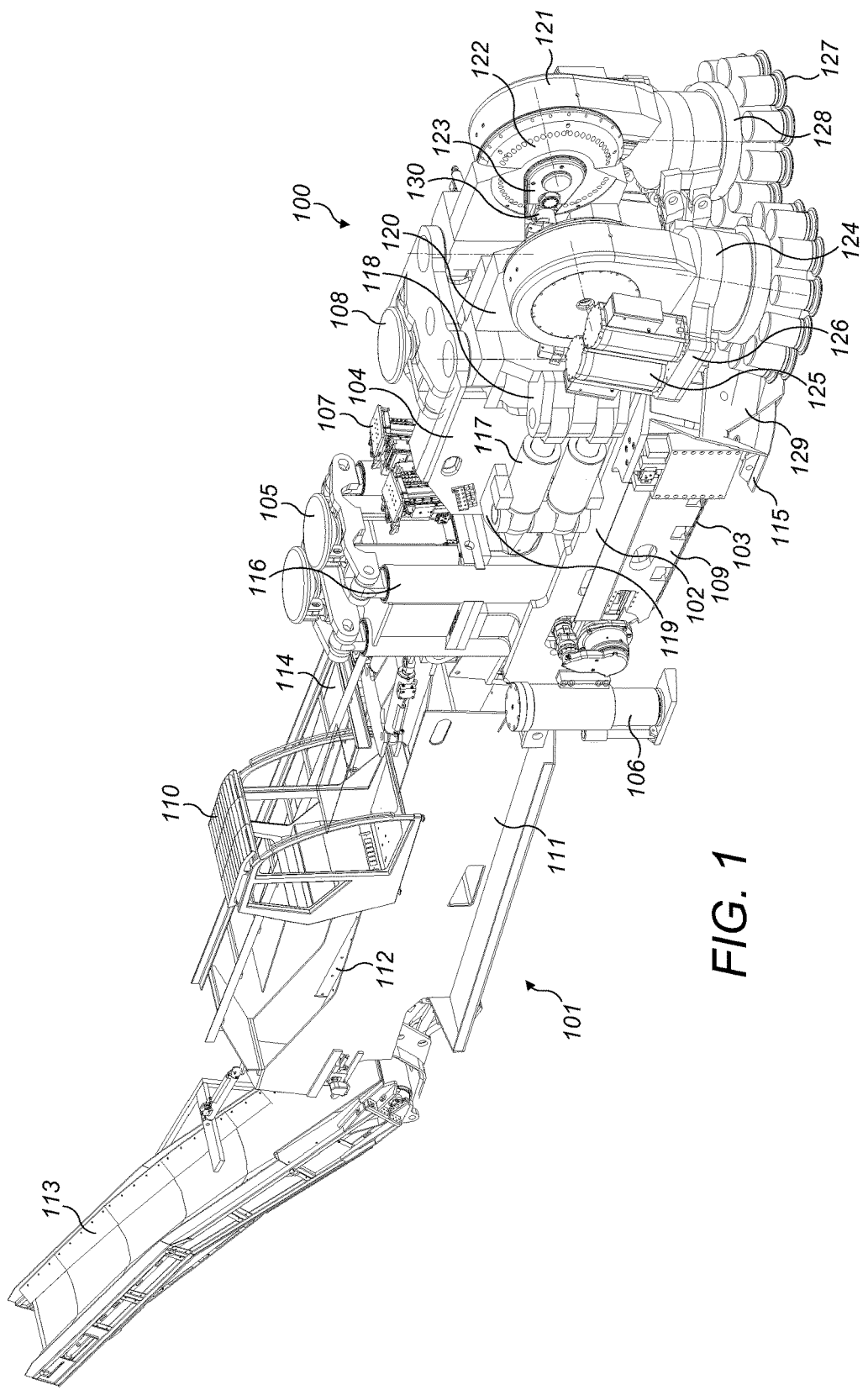
FIG. 1 is a front perspective view of a mobile cutting apparatus suitable for creating tunnels or subterranean roadways having a forward mounted cutting unit and a rearward control unit according to a specific implementation of the present invention.

Referring to FIG. 1, cutting apparatus 100 comprises a main frame 102 mounting a plurality of cutting components configured to cut into a rock or mineral face to create tunnels or subterranean roadways. Apparatus 100 is configured specifically for operation in an undercutting mode in which a plurality of rotatable roller cutters 127 may be forced into the rock to create a groove or channel and then to be pivoted vertically upward so as to overcome the reduced tensile force immediately above the groove or channel and break the rock. Accordingly, the present cutting apparatus is optimised for forward advancement into the rock or mineral utilising less force and energy typically required for conventional compression type cutters that utilise cutting bits or picks mounted at rotatable heads. However, the present apparatus may be configured with different types of cutting head to those described herein including in particular pick or bit type cutting heads in which each pick is angularly orientated at the cutting head to provide a predetermined cutting attack angle.

Figure 2:
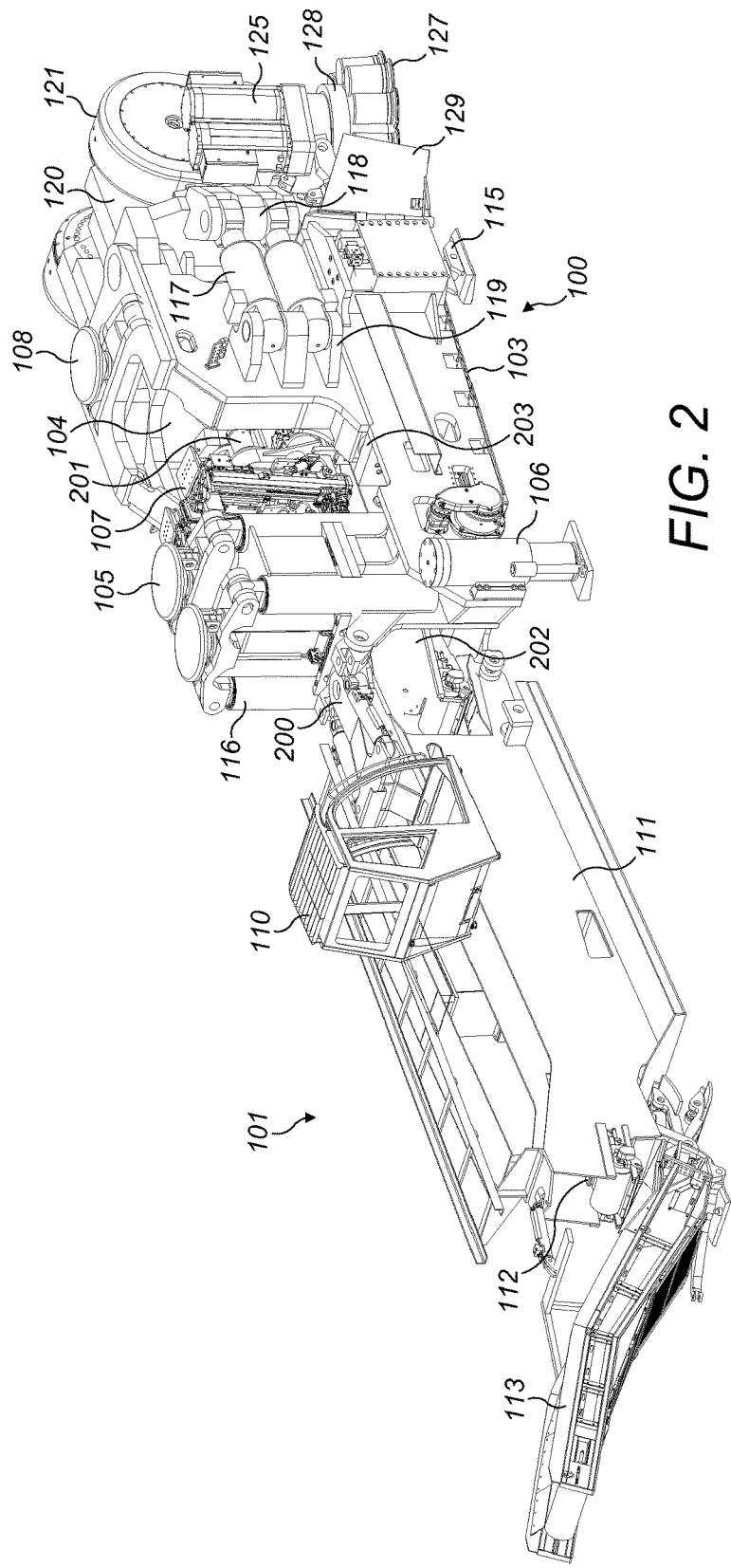
FIG. 2 is a rear perspective view of the cutting apparatus of FIG. 1.
Figure 3:
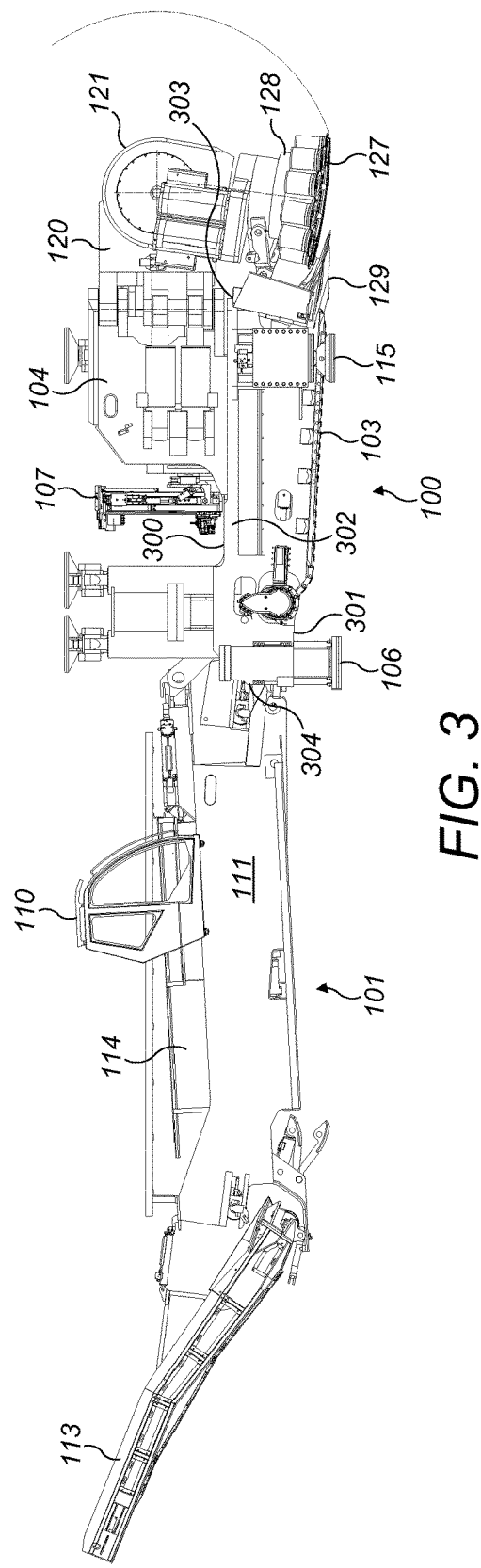
FIG. 3 is a side elevation view of the apparatus of FIG. 2.

Referring to FIGS. 1 to 3, main frame 102 comprises lateral sides 302 to be orientated towards the wall of the tunnel; an upward facing region 300 to be orientated towards a roof of the tunnel; a downward facing region 301 orientated to be facing the floor of the tunnel; a forward facing end 303 intended to be positioned facing the cutting face and a rearward facing end 304 intended to be positioned facing away from the cutting face.

An undercarriage 109 is mounted generally below main frame 102 and in turn mounts a pair of crawler tracks 103 driven by a hydraulic (or electric) motor to provide forward and rearward movement of apparatus 100 over the ground when in a non-cutting mode. A pair of rear ground engaging jacking legs 106 are mounted at frame sides 302 towards rearward end 304 and are configured to extend and retract linearly relative to frame 102. Frame 102 further comprises a forward pair of jacking legs 115 also mounted at each frame side 302 and towards forward end 303 and being configured to extend and retract to engage the floor tunnel. By actuation of legs 106, 115, main frame 102 and in particular tracks 103 may be raised and lowered in the upward and downward direction so as to suspend tracks 103 off the ground to position apparatus 100 in a cutting mode. A pair of roof engaging grippers 105 project upwardly from main frame 102 at frame rearward end 304 and are extendable and retractable linearly in the upward and downward direction via control cylinders 116. Grippers 105 are therefore configured to be raised into contact with the tunnel roof and in extendable combination with jacking legs 106, 115 are configured to wedge apparatus 100 in a stationary position between the tunnel floor and roof when in the cutting mode.

A sled 104 is slidably mounted on top of main frame 102 via a slide mechanism 203. Sled 104 is coupled to a linear hydraulic cylinder 201 such that by reciprocating extension and retraction of cylinder 201, sled 104 is configured slide linearly between frame forward and rearward ends 303, 304.

A pair of hydraulically actuated bolting units 107 is mounted at main frame 102 between sled 104 and roof gripping unit 105, 116 relative to a lengthwise direction of the apparatus. Bolting units 107 are configured to secure a mesh structure (not shown) to the roof of the tunnel as apparatus 100 is advanced in a forward cutting direction. Apparatus 100 also comprises a mesh support structure (not shown) mounted generally above sled 104 so as to positionally support the mesh directly below the roof prior to bolting into position.

Figure 4:
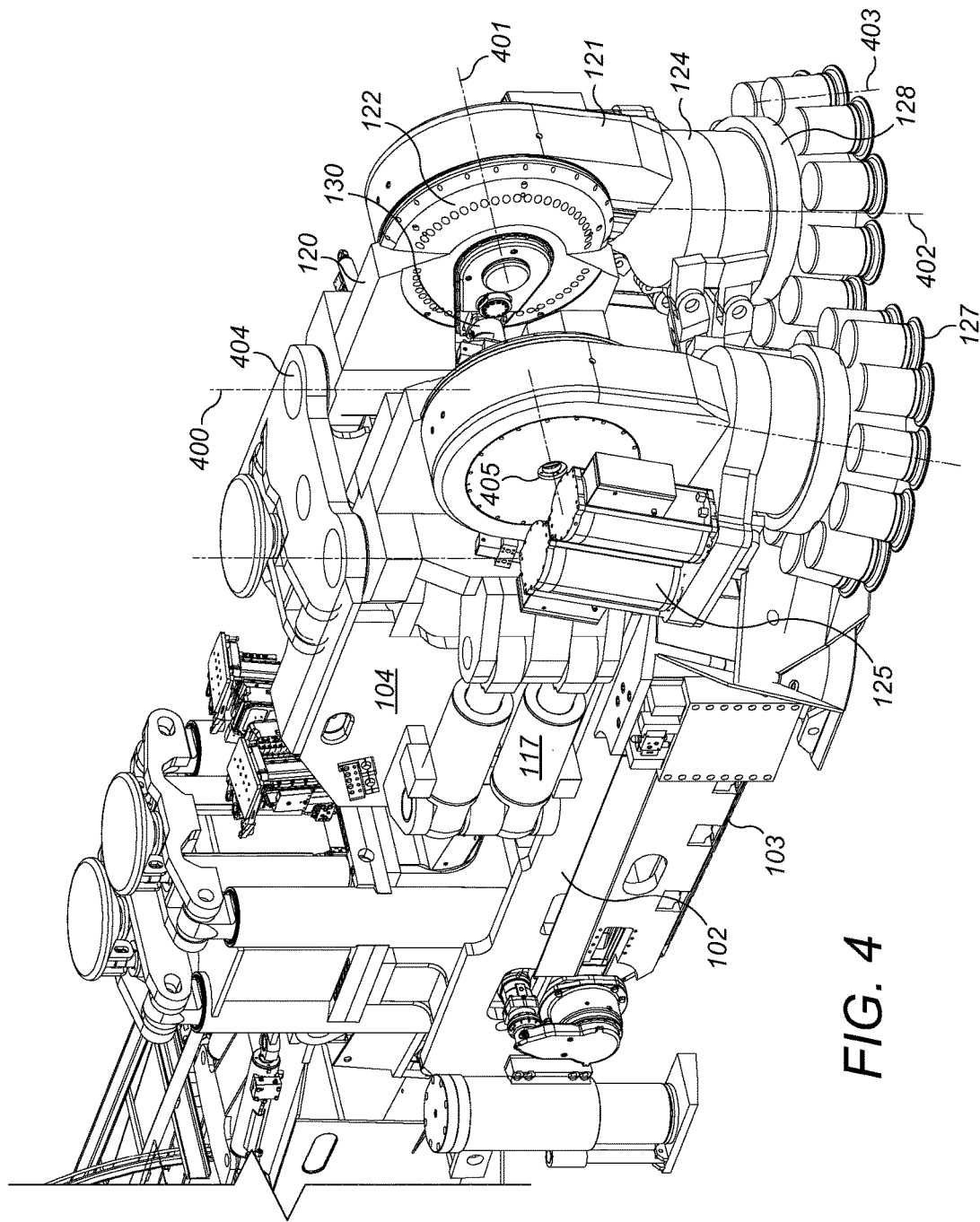
FIG. 4 is a magnified front perspective view of the cutting unit of the apparatus of FIG. 3.
Figure 5:
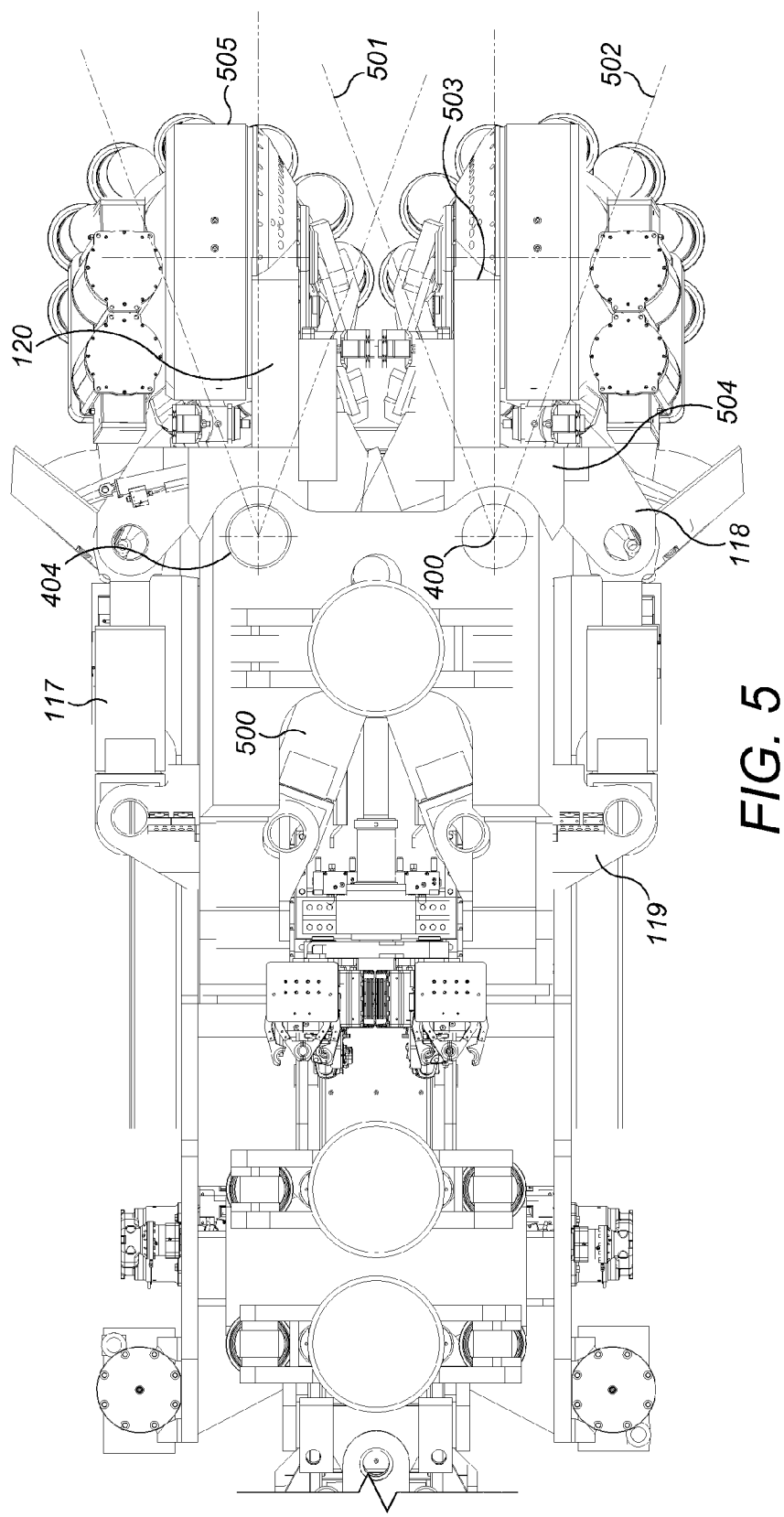
FIG. 5 is a plan view of the cutting apparatus of FIG. 4.

A pair of supports 120 are pivotally mounted at and project forwardly from sled 104 immediately above frame forward end 303. Supports 120 are generally spaced apart in a lateral widthwise direction of the apparatus 100 and are configured to independently pivot laterally outward from one another relative to sled 104 and main frame 102. Each support 120 comprises a forward end 503 and a rearward end 504 referring to FIG. 5. A first mount flange 118 is provided at support rearward end 504 being generally rearward facing. A corresponding second mount flange 119 projects laterally outward from a side of sled 104 immediately behind the first flange 118. A pair of linear hydraulic cylinders 117 is mounted to extend between flanges 118, 119 such that by linear extension and retraction, each support 120 is configured to pivot in the generally horizontal plane and in the lateral sideways direction relative to frame sides 302. Referring to FIG. 4, each support 120 is mounted at sled 104 via a pivot rod 404 extending generally vertically (when apparatus 100 is positioned on horizontal ground) through sled 104 and being suspended generally above the main frame forward end 303. Each support 120 is therefore configured to pivot or slew about pivot axis 400. Referring to FIG. 5, each support 120 is further coupled to a respective inner hydraulic cylinder 500 mounted at an inner region of sled 104 to cooperate with side mounted cylinders 117 to laterally slew each support 120 about pivot axis 400.

Referring to FIGS. 4 and 5, as the respective pivot axes 400 are space apart in the widthwise direction of apparatus 100, supports 120 are capable of being slewed inwardly to a maximum inward position 501 and to be slewed laterally outward to a maximum outward position 502. According to the specific implementation, an angle between the inner and outer slewing positions 501, 502 is 20°.

Figure 7:
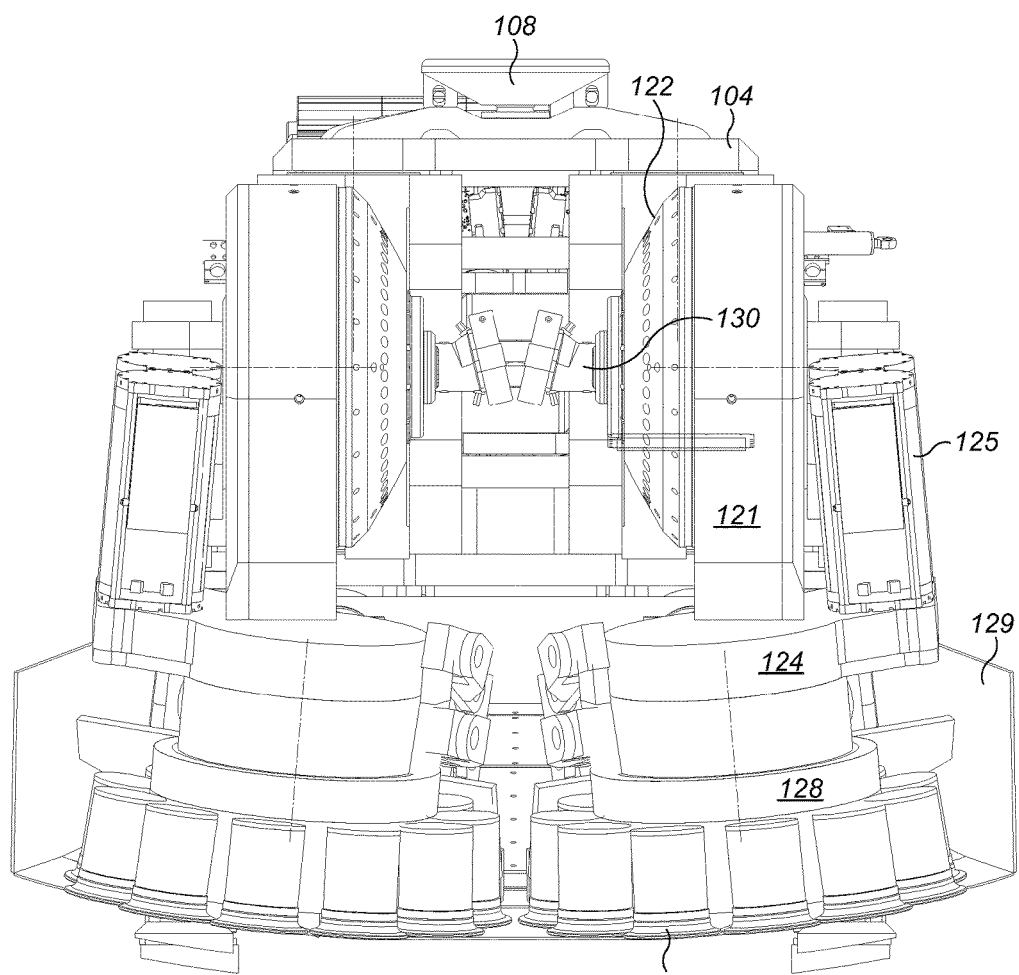
FIG. 7 is a front end view of the cutting apparatus of FIG. 6.

Referring to FIGS. 1 to 3, an arm 121 is pivotally mounted generally at the forward end 503 of each support 120. Each arm 121 comprises a cutting head 128 rotatably mounted at a distal end. Each cutting head 128 comprises a disk like (generally cylindrical) configuration. The plurality of generally annular or disc shaped roller cutters 127 are mounted at the circumferential perimeter of each head 128 and comprise a sharp annular cutting edge configured specifically for undercutting the rock. Cutters 127 are rotatably mounted independently relative to one another and head 128 and are generally free to rotate about their own axis. Each roller cutter 127 projects axially beyond a forwardmost annular edge of head 128 such that when arms 121 are orientated to be extending generally downward, roller cutters 127 represent a lowermost part of the entire head 128 and arm 121 assembly. Each arm 121 may be considered to comprise a length such that arm 121 is mounted at each respective support 120 at or towards a proximal arm end and to mount each head 128 at a distal arm end. In particular, each arm 121 comprises an internally mounted planetary gear indicated generally be reference 122. Each gear 122 is preferably a Wolfrom type and is coupled to a drive motor 130 via a drive train indicated generally by reference 123. A pair of drive motors 125 is mounted at the lateral sides of each arm 121 and is orientated to be approximately parallel with the rotational axis of each respective cutting head 128 as shown in FIG. 7. Each arm 121 further comprise an internal drive and gear assembly 124 coupled to a gear box 126 mounted at one end of each of the drive motors 125. Each cutting head 128 is driveably coupled to the drive motors 125 via the respective gear assembly 124 to provide rotation of cutting head 128 about axis 402.

According to the specific implementation, and as shown in FIG. 7, each arm 121 is coupled to a respective motor 130 mounted at a forward end of sled 104. Each planetary gear 122 is centred on a pivot rod 405 having a pivot axis 401 referring to FIG. 4. Each axis 401 is aligned to be generally horizontal when apparatus 100 is positioned on horizontal ground. Accordingly, each arm 121 is configured to pivot (relative to each support 120, sled 104 and main frame 102) in the upward and downward direction (vertical plane) by actuation of each motor 130. As such, each cutting head 128 and in particular the roller cutters 127 may be raised and lowered along the arcuate path 602 referring to FIG. 6. In particular, each arm 121, head 128 and roller cutters 127 may be pivoted between a lowermost position 601 and an uppermost raised position 600 with an angle between positions 600, 601 being approximately 150°. When in the lowermost position 601, each roller cutter 127 and in particular head 128 is suspended in a declined orientation such that a forwardmost roller cutter 127 is positioned lower than a rearwardmost roller cutter 127. According to the specific implementation, this angle of declination is 10°. This is advantageous to engage the cutters 127 into the rock face at the desired attack angle to create the initial groove or channel during a first stage of the undercutting operation. Additionally, the extensive range of movement of the cutting heads 128 over the rock face is possible due, in part, to axis 401 being separated and positioned forward relative to axis 400 by a distance corresponding to a length of each support 120.

Referring to FIG. 4, each support pivot axis 400 is aligned generally perpendicular to each arm pivot axis 401. Additionally, a rotational axis 402 of each cutting head 128 is orientated generally perpendicular to each arm pivot axis 401. A corresponding rotational axis 403 of each roller cutter 127 is angularly disposed relative to cutting head axis 402 so as to taper outwardly in the downward direction. In particular, each roller cutter axis 403 is orientated to be aligned closer to the orientation of each cutting head rotational axis 402 and support pivot axis 400 relative to the generally perpendicular arm rotational axis 401.

Accordingly, each support 120 is configured to slew laterally outward in a horizontal plane about each support axis 400 between the extreme inner and positions 501, 502. Additionally and referring to FIG. 6, each respective arm 121 is configured to pivot in the upward and downward direction about arm pivot axis 401 to raise and lower the roller cutters 127 between the extreme positions 600, 601.

A gathering head 129 is mounted at main frame forward end 303 immediately rearward behind each cutting head 128. Gathering head 129 comprises a conventional shape and configuration having side loading aprons and a generally inclined upward facing material contact face to receive and guide cut material rearwardly from the cutting face (and cutting heads 128). Apparatus 100 further comprises a first conveyor 202 extending lengthwise from gathering head 129 to project rearwardly from frame rearward end 304. Accordingly, material cut from the face is gathered by head 129 and transported rearwardly along apparatus 100.

Referring to FIGS. 1 to 3, a detachable control unit 101 is mounted to the frame rearward end 403 via a pivot coupling 200. Control unit 111 comprises a personnel cabin 110 (to be occupied by an operator). Unit 111 further comprises an electric and hydraulic power pack 114 to control the various hydraulic and electrical components of apparatus 100 associated with the pivoting movement of supports 120 and arms 121 in addition to the sliding movement of sled 104 and the rotational drive of cutting heads 128.

Control unit 101 further comprises a second conveyor 112 extending generally lengthwise along the unit 101 and coupled at its forwardmost end to the rearwardmost end of first conveyor 202. Unit 101 further comprises a discharge conveyor 113 projecting rearwardly from the rearward end of second conveyor 112 at an upward declined angle. Accordingly, cut material is capable of being transported rearwardly from cutting heads 128 along conveyors 202, 112 and 113 to be received by a truck or other transportation vehicle.

In use, apparatus 100 is wedged between the tunnel floor and roof via jacking legs 106, 115 and roof grippers 105. Sled 104 may then be displaced in a forward direction relative to main frame 102 to engage roller cutters 127 onto the rock face. Cutting heads 128 are rotated via motors 125 that create the initial groove or channel in the rock face at a lowermost position. A first arm 121 is then pivoted about axis 401 via motor 130 to raise roller cutters 127 along path 602 to achieve the second stage undercutting operation. The first support 120 may then be slewed in the lateral sideways direction via pivoting about axis 400 and combined with the raising and lowering rotation of roller cutters 127 creates a depression or pocket within the rock immediately forward of the first arm 121 and support 120. The second arm 121 and associated head 128 and cutters 127 are then actuated according to the operation of the first arm 121 involving pivoting in both the vertical and horizontal planes. This sequential dual pivoting movement of the second arm 121 is independent of the initial dual pivoting movement of the first arm 121. A phasing and sequencing of the pivoting of arms 121 about axes 401 and supports 120 about axes 400 is controlled via control unit 111.

When the maximum forward travel of sled 104 is achieved, jacking legs 106, 115 are retracted to engage tracks 103 onto the ground. Tracks 103 are orientated to be generally declined (at an angle of approximately 10° relative to the floor) such that when ground contact is made, the roller cutters 127 are raised vertically so as to clear the tunnel floor. The apparatus 100 may then be advanced forward via tracks 103. Jacking legs 106, 115 may then be actuated again to raise tracks 103 off the grounds and grippers 105 moved into contact with the tunnel roof to repeat the cutting cycle. A forwardmost roof gripper 108 is mounted above sled 104 to stabilise the apparatus 100 when sled 104 is advanced in the forward direction via linear actuating cylinder 201.

Figure 8:
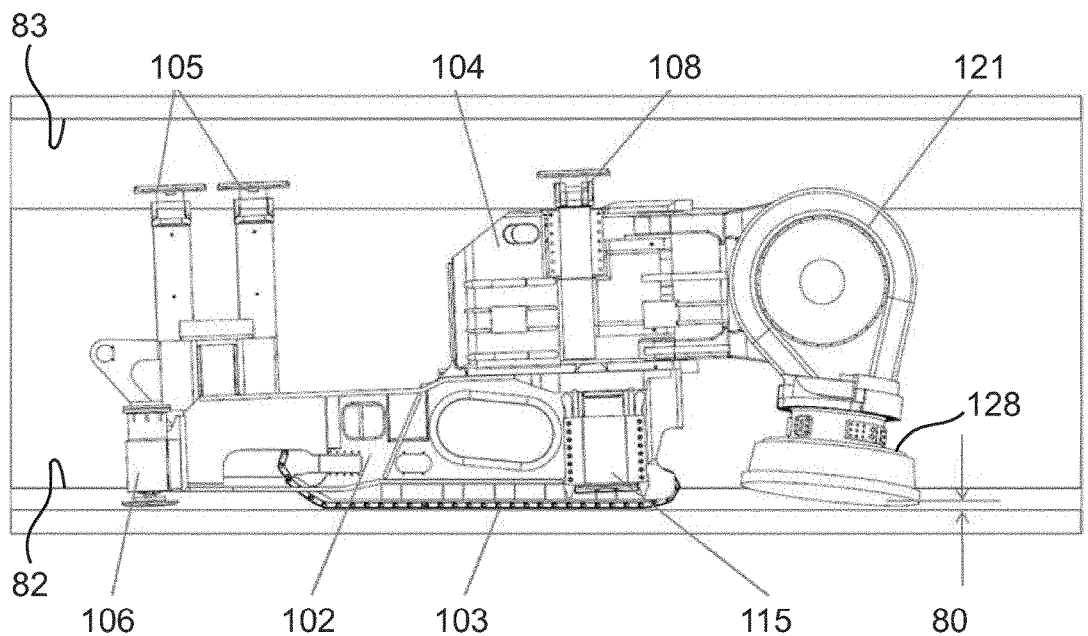
FIGS. 8 to 10 are simplified side elevation views of a cutting apparatus according to the invention in different modes.

Referring to FIG. 8, which shows a simplified side elevation view of the cutting apparatus according to the invention, the cutting apparatus rests on the pair of crawler tracks 103 and is thus in a non-cutting mode or a travel enabled mode, in which the cutting apparatus can move forward or rearward on the pair of crawler tracks 103.

As discussed above, the crawler tracks 103 are mounted to a main frame 102, on which further the sled 104 is mounted. The main frame 102 is further provided with the front pair of jacking legs 115 and the rear pair of jacking legs 106, which are retracted in the mode shown in FIG. 8. Further, to the main frame 102 are mounted two rear roof engaging grippers 105. The forward most roof gripper 108 is mounted to the sled 104, which is further provided with the arm 121, to which the cutting head 128 is connected as discussed above. The roof grippers 105, 108 are also retracted in the non-cutting mode, even though this is not necessarily the case.

The pair of crawler tracks 103 rest on the ground 82. As the pair of crawler tracks and specifically a plane defined by the lower surface thereof (which coincides with the ground 82 in FIG. 8) are inclined with respect to longitudinal direction of the cutting apparatus (see also FIGS. 9 and 10), the cutting head 128 which is held by the arm 121 in basically downwards direction is spaced apart (or raised from) the ground 82 by a clearance 80. The clearance 80 allows that the cutting apparatus can move without the cutting head 128 hitting the ground and without the need that the arm 121 would need to be pivoted in order to distance the cutting head 128 from the ground 82.

Figure 9:
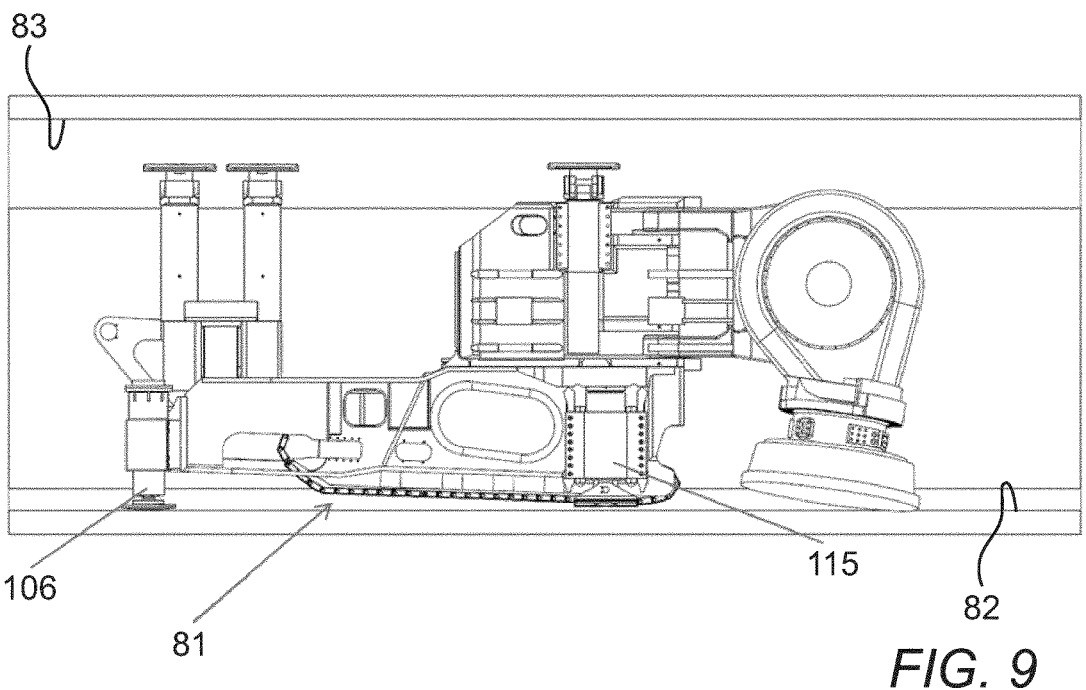

Referring to FIG. 9, in comparison to the case illustrated in FIG. 8, the front and rear jacking legs 106, 115 are extended and the cutting apparatus rests on the jacking legs 106, 115. The cutting apparatus is arranged horizontally and the movement direction of the sled 104 is parallel to the ground 82. The inclination of the plane defined by the pair of crawler tracks 103 and the cutting apparatus can be seen by angle 81.

Figure 10:
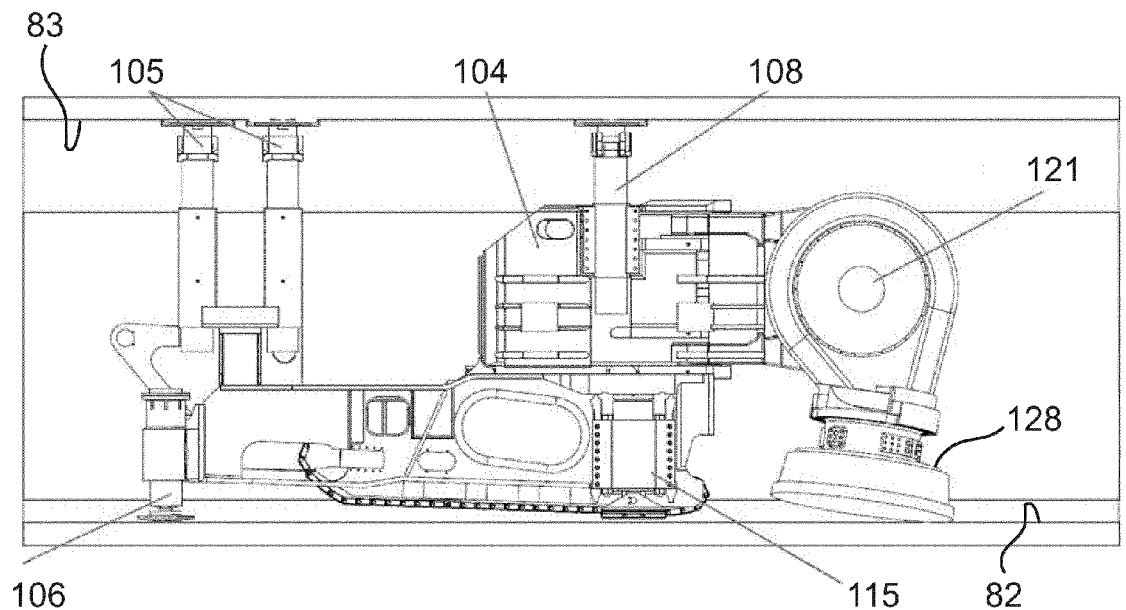

Referring to FIG. 10, the roof grippers 105, 108 are extended and are in contact with the roof 83, while in the case shown in FIG. 9, the roof grippers are retracted.

With the extended roof grippers 105, 108, the cutting apparatus is wedged between the roof 83 and floor 82 as discussed above. As the pair of crawler tracks 103 is lifted from the ground 82, forces occurring in context with the cutting operation are not exerted on the tracks 103.

Figure 6:
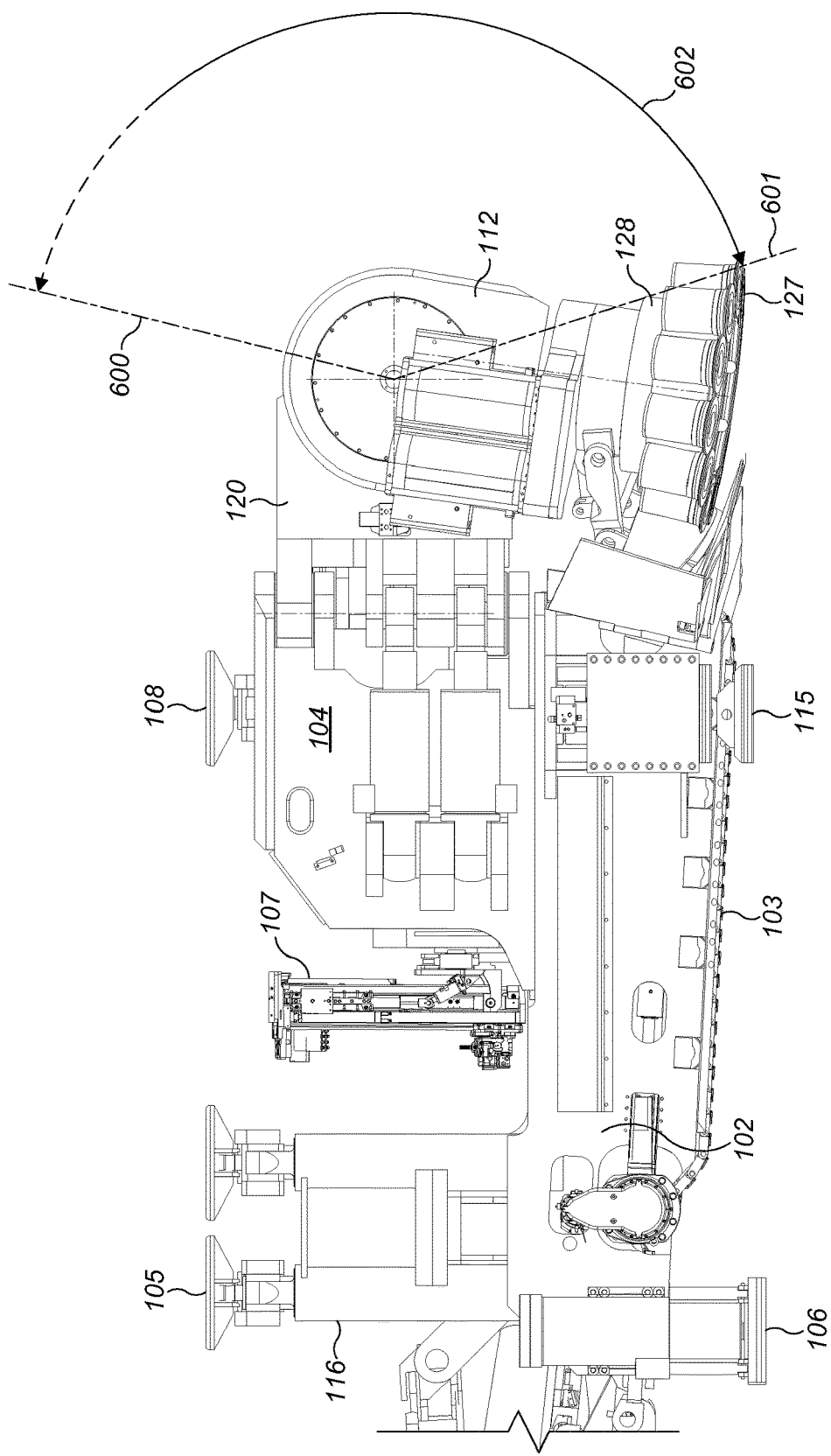
FIG. 6 is a side elevation view of the cutting apparatus of FIG. 5.

The illustrations provided by FIGS. 8 to 10 are simplified, for example, in comparison to otherwise similar FIGS. 3 and 6. The simplifications are provided for sake of explanation, while nevertheless the further features discussed above with respect to FIGS. 1 to 7 may also be provided for the cutting apparatus shown in FIGS. 8 to 10.

During cutting operation the cutting apparatus is stabilized (gripped) inside the tunnel as shown in FIG. 10. For relocation of the cutting apparatus, as well as for moving the machine forward during a regrip process the machine moves on crawlers (see FIG. 8).

To avoid that reaction forces from the cutting process are carried by the crawler tracks 103, the apparatus is lifted off the floor by means of the jacking legs 106, 115 as shown in FIGS. 9 and 10; two front jacking legs 115, one on each side of the main frame 102, and two rear jacking legs 106, one on each side of the main frame 102.

In addition of lifting the machine, the jacking legs 106, 115 (supports) also may serve to adjust the cutting apparatus' cutting direction in terms of pitch (inclination) and roll.

The crawler tracks 103 are arranged on the main frame at an angle 81 towards the longitudinal cutting direction, such that the apparatus tilts (in result) backwards when lowered on the floor, thus providing clearance 80 for the cutter heads from the floor or ground 82 during moving the cutting apparatus on the crawler tracks 103.

To ensure maximum machine stability during cutting, the cutting apparatus is equipped with a gripping system comprising two top rear grippers 105, mounted on the main frame 104, and one top front gripper 108 mounted on the sled 104.

After lifting the main frame 102 (and thus the cutting apparatus) off the floor and adjusting the cutting direction by means of the supports the two top rear grippers 105 are extended and engaged with the roof 83 providing active force to the roof by means of hydraulic cylinders.

During a sump in process, when sled 104 carrying the arms 121 and cutting heads 128 moves forward on guides in the main frame 104 the top front gripper 108 remains retracted. After reaching the final sump position the top front gripper 108 is extended and engaged with the roof 82 providing also active force to the roof 82.

Figure 11:
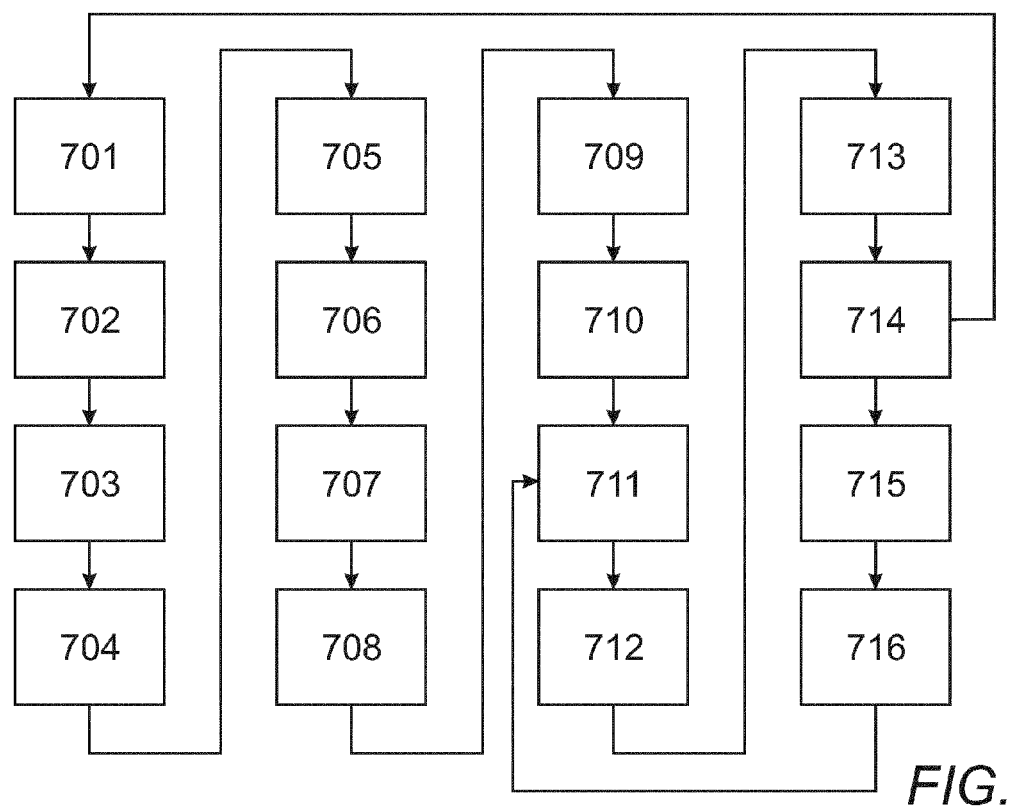
FIG. 11 is a schematic flow diagram illustrating a method according to the invention.

FIG. 11 is a schematic flow diagram illustrating a method according to the invention. The discussion of the method illustrated in FIG. 11 starts at a situation where an undercutting step is completed and the arm(s) carrying the cutting head(s) return (step 701) to a lowermost position (see 601 in FIG. 6). The front roof gripper is retracted (step 702), followed by a return (step 703) of the sled to the rearmost position. Once the sled is returned, the rear top grippers are retracted (step 704). As the next step the rear jacking legs are retracted (step 705), followed by retracting (step 706) the front jacking legs.

The retraction of the rear jacking legs in step 705 results in a backwards tilt (counter clock wise in the illustration of FIGS. 8 to 10, for example) of the cutting machine, which is partially reversed (or reduced) by retracting the front jacking legs in step 706. During the retraction of the rear jacking legs in step 705, the cutting apparatus tilts or pivots around an axis which basically corresponds to the contact position of the front jacking legs with the ground. During a first portion of the retraction of the front portion, there is a forwards tilt (clockwise in the illustration of FIGS. 8 to 10, for example), corresponding to a pivoting around an axis which basically corresponds to the contact position of the rear jacking legs with the ground. Once, however, the rear portion of the crawler tracks come into contact with the ground, the pivot axis shifts to such contact point.

Eventually, the cutting machine rests on the crawler tracks and thus can be moved (step 707) by operation of the crawler tracks.

Once the desired position on the ground is reached by movement on the crawler tracks, the front jacking legs are extended (step 708), followed by extension of the rear jacking legs (step 709). In this situation, the cutting apparatus again rests on the jacking legs.

To secure the cutting apparatus in such position, the top rear grippers are extended (step 710), allowing for a sump in (step 711) including a forward movement of the sled to bring the cutting head forward. Once the sump in is completed, also the top front gripper is extended (step 712), completing the wedging of the cutting apparatus between floor and roof by means of the grippers and the jacking legs.

This is followed by an undercutting (step 713), during which the cutting head is brought upwards in a pivoting movement (position 601 to position 600 along arc 602 in FIG. 6).

Depending on whether or not the sled can move further forward in relation to the main frame (determination in step 714), the process either continues to step 715 or returns to step 701.

In case a further forward movement is possible, in step 715, there is a return of the cutting head to the initial position (see 601 in FIG. 6), followed by a retraction (step 716) of the top front gripper, thus allowing for a movement of the sled in relation to the main frame. After step 716, the process returns to step 711.

In case no further forward movement of the sled in relation to the main frame is possible (i.e. there have already been multiple loops of steps 711 to step 716), the process returns to step 701, eventually allowing for a movement of the complete cutting apparatus.

It is not necessarily the case that the steps 701 to 704, for example, are carried out in sequence in the sense that a later step starts only after an earlier step is finished. It is also possible to provide at least some of these steps at least partially in parallel.

Further, if desired, the retracting of the front and rear jacking legs can be carried out (at least partially) in parallel such that the attitude of the cutting apparatus is first brought (gradually) to being parallel to the ground, such that the cutting apparatus is put on the crawler tracks so that basically the crawler tracks touch the ground from front to end at the same time.

Yet further, provided that the cutting head(s) and the overall arrangement of the cutting apparatus allow for such operation, the retracting of the jacking legs may be provided in such manner that for a certain portion thereof the cutting apparatus partially rests on the cutting head (e.g. by first retracting the front jacking legs and then retracting the rear jacking legs to put the cutting apparatus on the crawler tracks).

EXEMPLARY EMBODIMENTS

Embodiment 1

Cutting apparatus (100) suitable for creating tunnels or subterranean roadways and the like comprising:
a main frame (102) having generally upward (300), downward (301) and side (302) facing regions;
a first and second support (120) pivotally mounted relative to the main frame (102) via respective first and second support axes (400) aligned generally upright relative to the upward (300) and downward (301) facing regions such that each first and second support (120) is configured to pivot laterally in a sideways direction relative to the side (302) facing regions;
at least one first and second support actuator (117) to respectively actuate independently movement of each of the first and second supports (120) relative to the main frame (102);
a first and second arm (121) each pivotally mounted to the respective first and second (120) support via a respective arm pivot axis (401) aligned in a direction extending transverse including perpendicular to each support pivot axis (400) to enable the first and second arms (121) to pivot independently of one another and to pivot relative to each of the respective first and second supports (120) in an upward and downward direction relative to the upward (300) and downward (301) facing regions;
at least one first and second arm actuator (122, 130) to actuate independently pivoting movement of the first and second arms (121) relatives to each of the respective first and second support (120);
a rotatable cutting head (128) mounted at each of the first and second arms (121), each head (128) rotatable about a head axis (402) orientated to extend substantially transverse to each respective arm pivot axis (401).

Embodiment 2

The apparatus of embodiment 1 wherein each cutting head comprises a generally annular cutting edge or layered cutting edges to provide an undercutting mode of operation.

Embodiment 3

The apparatus of embodiment 1 or 2 further comprising a plurality of roller cutters (127) independently rotatably mounted at each rotatable cutting head (128).

Embodiment 4

The apparatus of embodiment claim 3 wherein the plurality of roller cutters (127) are generally annular roller cutters each having a generally annular cutting edge or layered cutting edges to provide an undercutting mode of operation.

Embodiment 5

The apparatus of any one of the preceding embodiments wherein each of the first and second arm actuator (122, 130) comprises a planetary gear assembly mounted at the junction at which each arm (121) pivots relative to each support (120).

Embodiment 6

The apparatus of any one of the preceding embodiments wherein at least one of the first and second arm actuator (122, 130) comprises at least one first drive motor to drive the pivoting movement of the first and/or second arm (121) relative to the respective first and second support (120).

Embodiment 7

The apparatus of any one of the preceding embodiments further comprising at least one second drive motor (125) to drive rotation of the cutting head (128) at the first and/or the second arm (121).

Embodiment 8

The apparatus of any one of the preceding embodiments wherein the first and second support actuator (117) comprises a hydraulic linear actuator.

Embodiment 9

The apparatus of any one of the preceding embodiments further comprising a powered sled (104) movably mounted at the main frame (102) to be configured to slide in a forward cutting direction of the apparatus (100) relative to the main frame (102).

Embodiment 10

The apparatus of embodiment 9 wherein each of the first and second cutting head (128) is mounted at the sled (104) via the respective first and second arms (121) and supports (120) so as to be configured to advance in the forward cutting direction.

Embodiment 11

The apparatus of any one of the preceding embodiments wherein:
each of the first and second arms (121) is configured to pivot in the upward and downward direction by up to 180°; and
each of the first and second supports (120) is configured to pivot in the lateral sideways direction by up to 90°.

Embodiment 12

The apparatus of any one of the preceding embodiments further comprising tracks (103) or wheels mounted at the main frame (102) to allow the apparatus (100) to move in a forward and rearward direction.

Embodiment 13

The apparatus of any one of the preceding embodiments further comprising floor and roof engaging members (106, 115, 105, 108) mounted at the main frame (102), at least the floor engaging members (106, 115) being extendable and retractable to respectively raise and lower the apparatus (100) in the upward and downward direction.

Embodiment 14

The apparatus of any one of the preceding embodiments further comprising:
a first material discharge conveyor (202) to convey cut material rearwardly from the first and second cutting head (128); and
a gathering head (129) to direct cut material onto the conveyor (202), the gathering head (129) positioned rearwardly behind at least one of the first and second cutting heads (128).

Embodiment 15

The apparatus of embodiment 14 further comprising a control unit (101) demountably connectable to the apparatus (100), the control unit (101) comprising operational components (114) to power at least the first and second support (120) and arm actuators (122, 130), the control unit (101) further comprising a second conveyor (112) to receive material from the first conveyor (202) and to discharge the material at a position rearward of the apparatus (100) and the control unit (101).

Embodiment 16

Cutting apparatus (100) suitable for creating tunnels or subterranean roadways and the like comprising:
a main frame (102) having generally upward (300), downward (301) and side (302) facing regions;
a powered sled (104) movably mounted at the main frame (102) to be configured to slide in a forward cutting direction of the apparatus (100) relative to the main frame (102);
a first and second arm (121) pivotally mounted to the sled (104) by respective pivot arm axes (401) aligned in a direction extending transverse including perpendicular to a longitudinal axis of the main frame (102) to allow each arm (121) to pivot independently of one another in an upward and downward direction relative to the upward and downward facing region of the main frame (102);
at least one first and second arm actuator (122, 130) to actuate independent pivoting movement of the first and second arms (121) relative to one another and the main frame (102);
a rotatable cutting head (128) mounted at each of the first and second arms (121) so as to be configured to be moved in the upward and downward direction and advanced in the forward cutting direction, each head (128) rotatable about a head axis (402) orientated to extend substantially transverse to respective pivot arm axes (401).

Embodiment 17

The apparatus of embodiment 16 wherein each first and second arm (121) together with the respective pivot arm axes is respectively mounted to the sled (104) via a first and second support (120) that is slidably mounted relative to the sled (104) via a common or respective slidable means such that each first and second support (120) is configured to slide laterally in a sideways direction relative to the side facing regions (302).

Embodiment 18

The apparatus of embodiment 16 or 17 wherein each rotatable cutting head (128) comprises a generally annular roller cutter (127) each having a generally annular cutting edge or layered cutting edges to provide an undercutting mode of operation.

Embodiment 19

The apparatus of any one of embodiments 16 to 18 further comprising a plurality of roller cutters (127) independently rotatably mounted at each rotatable cutting head (128).

Embodiment 20

The apparatus of embodiment 19 wherein the plurality of roller cutters (127) are generally annular roller cutters each having a generally annular cutting edge or layered cutting edges to provide an undercutting mode of operation.

Embodiment 21

The apparatus of any one of embodiments 17 to 20 wherein each of the first and second arm actuator (122, 130) comprises a planetary gear assembly mounted at the junction at which each arm (121) pivots relative to each support.

The features of the embodiments presented hereinabove are understood to be, alone or in combination with each other, preferred embodiments of the invention in themselves as well as in combination with what is claimed hereinafter.

The invention claimed is:

1. A cutting apparatus suitable for creating tunnels or subterranean roadways and the like comprising:
a main frame having generally upward, downward and side facing regions;
at least one arm pivotally mounted via an arm pivot axis aligned in a direction extending transverse including perpendicular to a generally upright direction relative to the upward and downward facing regions to pivot the arm relative to the main frame in an upward and downward direction relative to the upward and downward facing regions;
at least one arm actuator arranged to actuate pivoting movement of the arm relative to the main frame;
a rotatable cutting head mounted at the arm rotatable about a head axis orientated to extend substantially transverse to the arm pivot axis;
a pair of crawler tracks or a set of wheels arranged to provide forward and rearward movement of the cutting apparatus over ground; and
a set of floor engaging members mounted at the main frame, wherein the floor engaging members are extendable to provide a cutting mode of the cutting apparatus, in which the cutting apparatus rests on the floor engaging members, and are retractable to provide a non-cutting mode of the cutting apparatus, in which the cutting apparatus rests on the pair of crawler tracks or set of wheels, the pair of crawler tracks or the set of wheels defining a plane inclined relative to the main frame such that upon changing from the cutting mode to the non-cutting mode the cutting head is raised away from the ground.

2. The cutting apparatus according to claim 1, wherein the inclination of the plane defined by the pair of crawler tracks or the set of wheels relative to the main frame is in the range from 1° to 10°.

3. The cutting apparatus according to claim 1, wherein the inclination of the plane defined by the pair of crawler tracks or the set of wheels relative to the main frame is set such that the cutting head is raised in an amount in the range from 3 cm to 30 cm.

4. A cutting apparatus suitable for creating tunnels or subterranean roadways and the like comprising:
a main frame having generally upward, downward and side facing regions;
a powered sled movably mounted at the main frame and configured to slide in a forward cutting direction of the cutting apparatus relative to the main frame;
at least one arm pivotally mounted to the sled via an arm pivot axis aligned in a direction extending transverse including perpendicular to a generally upright direction relative to the upward and downward facing regions such that the arm is arranged to pivot relative to the main frame in an upward and downward direction relative to the upward and downward facing regions;
at least one arm actuator arranged to actuate pivoting movement of the arm relative to the main frame;
a rotatable cutting head mounted at the arm; and
a plurality of engaging members mounted at the main frame, the engaging members including floor engaging members, roof or side wall engaging members, at least the floor engaging members being extendable and retractable to respectively raise and lower the apparatus in the upward and downward direction, wherein at least one of the roof or side wall engaging members being mounted to the powered sled and configured to extend to wedge the cutting apparatus in cooperation with the other engaging members in a cutting mode of the cutting apparatus between the roof or side wall and the floor.

5. The cutting apparatus according to claim 1, further comprising:
a powered sled movably mounted at the main frame and configured to slide in a forward cutting direction of the cutting apparatus relative to the main frame, wherein the at least one arm is mounted to the sled; and
a set of roof or side wall engaging members mounted at the main frame, wherein at least one roof or side wall engaging member is mounted to the powered sled and is configured for being extended for wedging the cutting apparatus in cooperation with the other engaging members in a cutting mode of the cutting apparatus between roof or side wall and floor.

6. The cutting apparatus according to claim 1, wherein the floor engaging members are configured to arrange the cutting apparatus, during the cutting mode, such that the upward facing region is horizontal and/or parallel to the ground.

7. The cutting apparatus according to claim 4, wherein the floor engaging members are configured to arrange the cutting apparatus, during the cutting mode, such that a movement direction of the powered sled is parallel to the ground.

8. The cutting apparatus according to claim 4, wherein the plurality of engaging members include two front floor engaging members, two rear engaging members, two roof engaging members mounted at the main frame, and the at least one roof engaging member mounted to the sled, wherein the two roof engaging members mounted to the main frame are at a position backwards in relation to the sled.

9. The cutting apparatus according claim 1, wherein the plurality of engaging members are each extendable and retractable linearly by a respective control cylinder.

10. A method of operating a cutting apparatus for creating tunnels or subterranean roadways and the like, the method comprising:
providing a cutting apparatus, the cutting apparatus including a main frame having generally upward, downward and side facing regions, at least one arm pivotally mounted via an arm pivot axis aligned in a direction extending transverse including perpendicular to a generally upright direction relative to the upward and downward facing regions to pivot the arm relative to the main frame in an upward and downward direction relative to the upward and downward facing regions, at least one arm actuator arranged to actuate pivoting movement of the arm relative to the main frame, a rotatable cutting head mounted at the arm, a pair of crawler tracks or a set of wheels allowing a forward and rearward movement of the cutting apparatus over ground, and a set of floor engaging members mounted at the main frame;
a cutting step;
a non-cutting step including a forward or rearward movement of the cutting apparatus over ground;
a first transition step from the non-cutting step to the cutting step including an extending of the floor engaging members such that the cutting apparatus rests on the floor engaging members; and
a second transition step from the cutting step to the non-cutting step including a retracting of the floor engaging members such that the cutting apparatus rests on the pair of crawler tracks or set of wheels, wherein the pair of crawler tracks or the set of wheels define a plane inclined relative to the main frame such that the second transition step includes a backward-tilting of the cutting apparatus, causing the rotatable cutting head to be raised away from the ground.

11. The method according to claim 10, further comprising an adjustment step of adjusting a direction and/or position of the cutting apparatus by the floor engaging members and/or the pair of crawler tracks or set of wheels.

12. A method of operating a cutting apparatus for creating tunnels or subterranean roadways and the like, comprising the steps of:
providing a main frame having generally upward, downward and side facing regions, a powered sled movably mounted at the main frame and configured to slide in a forward cutting direction of the cutting apparatus relative to the main frame, at least one arm pivotally mounted to the sled via an arm pivot axis aligned in a direction extending transverse including perpendicular to a generally upright direction relative to the upward and downward facing regions to pivot the arm relative to the main frame in an upward and downward direction relative to the upward and downward facing regions, at least one arm actuator arranged to actuate pivoting movement of the arm relative to the main frame, a rotatable cutting head mounted at the arm, and a plurality of engaging members mounted at the main frame, the plurality of engaging members including floor engaging members and roof or side wall engaging members, at least the floor engaging members being extendable and retractable to respectively raise and lower the apparatus in the upward and downward direction, wherein at least one roof or side wall engaging member is mounted to the powered sled;
an anchoring step of extending at least the floor engaging members so to wedge the cutting apparatus between the roof or side wall and the floor; and an operation step including an extending of the at least one roof or side wall engaging member mounted to the powered sled for cooperating with the other engaging members in wedging the cutting apparatus between the roof or side wall and the floor.

13. The method according to claim 12, wherein the operation step further includes, after the extending of the at least one roof or side wall engaging member, a cutting step including a pivoting of the arm relative to the main frame and a cutting by the cutting head, and wherein the operation step further includes, after the cutting, a retracting of the at least one roof or side wall engaging member and a moving of the sled.

14. The method according to claim 13, wherein the operation step includes multiple repetitions of the extending of the at least one roof or side wall engaging member, the cutting step and the retracting of the at least one roof or side wall engaging member and moving of the sled in this order.

15. The method according to claim 12, wherein the cutting apparatus includes a pair of crawler tracks or a set of wheels allowing a forward and rearward movement of the cutting apparatus over ground, and the method further comprises a non-cutting step including a forward or rearward movement of the cutting apparatus over ground, and a second transition step from the anchoring or operation step to the non-cutting step including a retracting of the floor engaging members such that the cutting apparatus rests on the pair of crawler tracks or set of wheels, the pair of crawler tracks or the set of wheels defining a plane inclined relative to the main frame such that the second transition step includes a backward-tilting of the cutting apparatus, causing the rotatable cutting head to be raised away from the ground.

* * * * *